US009567790B2

(12) United States Patent
Yamada et al.

(10) Patent No.: US 9,567,790 B2
(45) Date of Patent: Feb. 14, 2017

(54) DEVICE FOR CONTROLLING VEHICLE OPENING/CLOSING ELEMENT

(71) Applicant: AISIN SEIKI KABUSHIKI KAISHA, Kariya-shi (JP)

(72) Inventors: Masato Yamada, Hekinan (JP); Takeshi Nishikibe, Tokai (JP); Hitoshi Takayanagi, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 14/378,550

(22) PCT Filed: Feb. 22, 2013

(86) PCT No.: PCT/JP2013/054576
§ 371 (c)(1),
(2) Date: Aug. 13, 2014

(87) PCT Pub. No.: WO2013/129261
PCT Pub. Date: Sep. 6, 2013

(65) Prior Publication Data

US 2015/0057895 A1 Feb. 26, 2015

(30) Foreign Application Priority Data

Feb. 29, 2012 (JP) ................................ 2012-044001

(51) Int. Cl.
*B60J 5/06* (2006.01)
*E05F 15/659* (2015.01)
(Continued)

(52) U.S. Cl.
CPC ........... *E05F 15/659* (2015.01); *E05F 15/632* (2015.01); *E05F 15/70* (2015.01); *E05Y 2201/22* (2013.01);
(Continued)

(58) Field of Classification Search
None
See application file for complete search history.

(56) References Cited

U.S. PATENT DOCUMENTS 6,164,015 A * 12/2000 Kawanobe ........... E05F 15/646 49/360
2005/0288840 A1* 12/2005 Suzuki .................. B60J 7/0573 701/49
(Continued)

FOREIGN PATENT DOCUMENTS

JP 11/324482 * 11/1999 ................ B60J 5/04
JP 11324482 * 11/1999 ................ B60J 5/04
(Continued)

OTHER PUBLICATIONS

English language translation of International Preliminary Report on Patentability (Form PCT/IB/373) and the Translation of Written Opinion of the International Searching Authority (Form PCT/ISA/237) issued on Sep. 2, 2014, by the International Bureau of WIPO in corresponding International Application No. PCT/JP2013/054576. (9 pages).
(Continued)

*Primary Examiner* — Truc M Do
*Assistant Examiner* — Jess Whittington
(74) *Attorney, Agent, or Firm* — Buchanan Ingersoll & Rooney PC

(57) ABSTRACT

An opening/closing body control device for a vehicle is provided with a drive section configured to drive an opening/closing body of a vehicle, and a controller configured to control the drive section. In response to detection of an external force input intended to accelerate the opening/closing body in operation, the controller controls the drive section to increase the operating speed of the opening/closing element. The drive section determines that the external force intended to accelerate the opening/closing
(Continued)

body has been input if, as one example, the acceleration of the opening/closing body in an operation direction reaches a predetermined value or higher.

19 Claims, 7 Drawing Sheets

(51) Int. Cl.
*E05F 15/632* (2015.01)
*E05F 15/70* (2015.01)

(52) U.S. Cl.
CPC ....... *E05Y 2201/244* (2013.01); *E05Y 2400/32* (2013.01); *E05Y 2400/336* (2013.01); *E05Y 2400/36* (2013.01); *E05Y 2800/113* (2013.01); *E05Y 2900/531* (2013.01)

(56) References Cited

U.S. PATENT DOCUMENTS

| | | | | |
|---|---|---|---|---|
| 2006/0137136 | A1* | 6/2006 | Imai | B60J 5/06 16/52 |
| 2008/0296929 | A1* | 12/2008 | Suzuki | B60J 5/12 296/146.9 |
| 2009/0039673 | A1* | 2/2009 | Fukumoto | E05F 5/003 296/155 |
| 2010/0313477 | A1* | 12/2010 | McKee | E05F 15/60 49/28 |
| 2012/0123649 | A1* | 5/2012 | Eggers | B60R 13/07 701/49 |
| 2012/0180391 | A1* | 7/2012 | McKee | H02P 29/028 49/28 |

FOREIGN PATENT DOCUMENTS

| | | | | | |
|---|---|---|---|---|---|
| JP | 3055255 | B2 | 6/2000 | | |
| JP | 2001-049953 | A | 2/2001 | | |
| JP | 3857459 | B2 | 12/2006 | | |
| JP | 2007-009650 | A | 1/2007 | | |
| JP | 2007009650 | * | 1/2007 | | B60J 5/06 |
| JP | 2007-092292 | A | 4/2007 | | |
| JP | 2008-038488 | A | 2/2008 | | |
| JP | 4161898 | B2 | 8/2008 | | |
| JP | 2009-079353 | A | 4/2009 | | |

OTHER PUBLICATIONS

U.S. Appl. No. 14/377,837, filed Aug. 8, 2014, Nishikibe et al.
U.S. Appl. No. 14/374,411, filed Jul. 24, 2014, Hirota et al.
International Search Report (PCT/ISA/210) mailed on May 14, 2013, by the Japanese Patent Office as the International Searching Authority for International Application No. PCT/JP2013/054576.

* cited by examiner

DEVICE FOR CONTROLLING VEHICLE OPENING/CLOSING ELEMENT

TECHNICAL FIELD

The present invention relates to an opening/closing body control device for a vehicle.

BACKGROUND ART

Opening/closing body control devices for vehicles have been proposed that allow an opening/closing body of a vehicle to be opened and closed by a drive source like a door opening/closing apparatus disclosed in, for example, Patent Document 1. Such a control apparatus detects the manipulation speed of a handle provided on a door and determines the operation speed of the door based on the manipulation speed.

That is, there is a correlation between the manipulation speed of the door handle and the operation speed of the door that the user desires. With the above configuration, the operation speed of the opening/closing body is easily changed by intuitive manipulation input to the door handle by the user. This improves convenience for users.

PRIOR ART DOCUMENTS

Patent Document

Patent Document 1: Japanese Patent No. 4161898

SUMMARY OF THE INVENTION

Problems that the Invention Is to Solve

However, in a manipulation member for a vehicle such as a door handle, since the manipulation force required to manipulate the manipulation member at the same manipulation speed typically changes due to deterioration with age, there is a possibility that the manipulation speed of the manipulation member may not always reflect the intention of a user. In particular, in an opening/closing body such as a door in which the operation position is restrained at a fully closed position (or a fully opened position) by a lock mechanism, strong manipulation force is required for manipulating the manipulation member to release the lock mechanism. It is therefore difficult to intentionally adjust the manipulation speed of the manipulation member. In addition, the configuration for detecting the manipulation speed of the manipulation member increases manufacturing costs.

Accordingly, it is an objective of the present invention to provide an opening/closing body control device for a vehicle that allows a user to operate an opening/closing body at a desired appropriate speed.

Means for Solving the Problems

To achieve the foregoing objective, the present invention provides an opening/closing body control device for a vehicle that includes a drive section that drives an opening/closing body of the vehicle and a controller configured to control the drive section. The controller includes a speed varying section that controls the drive section to increase an operation speed of the opening/closing body in response to detection of an external force input intended to accelerate the opening/closing body in operation.

According to the above configuration, the opening/closing body is operated at a great speed through intuitive manipulation such as pressing or pulling the opening/closing body in the operation direction. Thus, the opening/closing body is opened and closed at an appropriate speed that the user desires.

MODES FOR CARRYING OUT THE INVENTION

First Embodiment

A first embodiment of the present invention will now be described with reference to the drawings.

Figure 1:
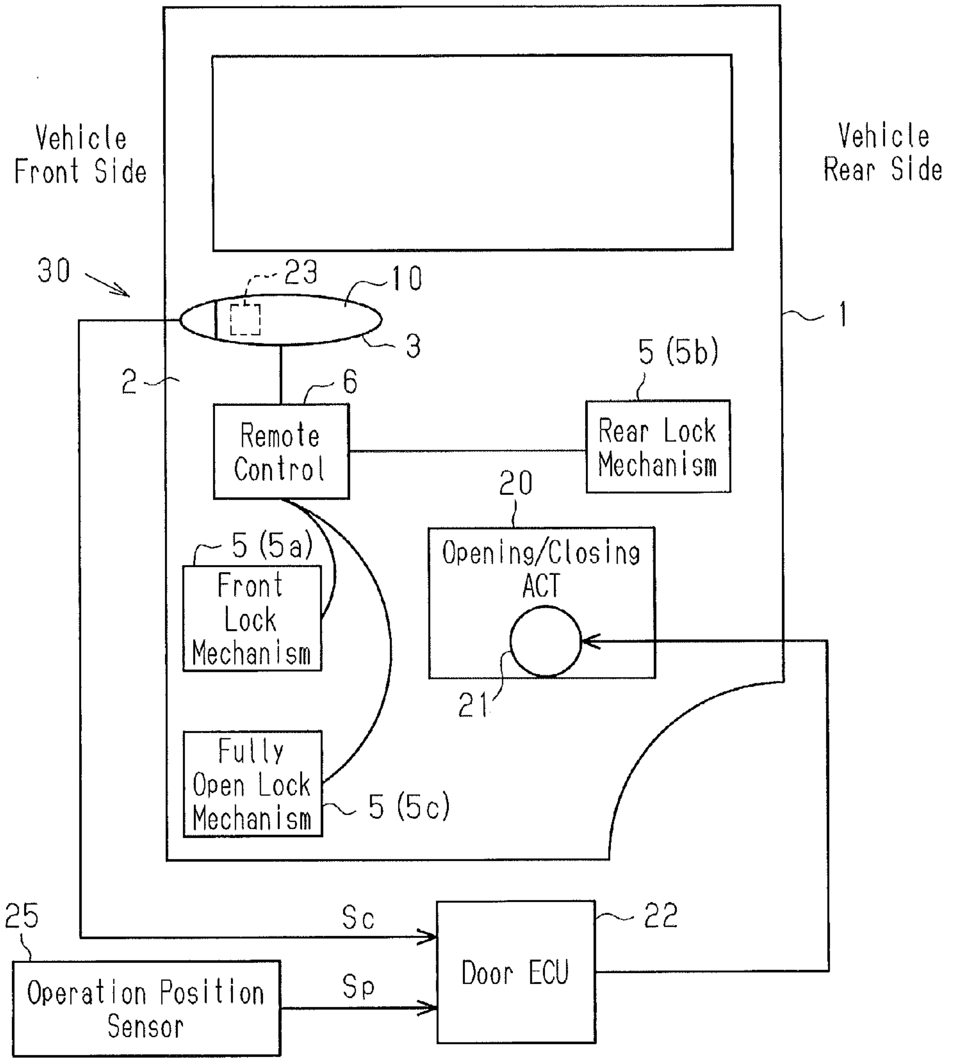
FIG. 1 is a schematic diagram illustrating a door control device according to the present invention.

As shown in FIG. 1, an opening/closing body, which is a sliding door 1 in this embodiment, is movable in a vehicle fore-and-aft direction to be able to open/close an opening portion (not shown) formed in a side surface of a vehicle body. More specifically, the sliding door 1 moves toward a vehicle front side (left side in FIG. 1) to be held in a closed state where the sliding door 1 closes the opening portion of the body, and moves toward a vehicle rear side (right side in FIG. 1) to be held in an open state where passengers are allowed to get in and out through the opening portion. An outer panel 2, which forms the outer surface (ornamental surface) of the sliding door 1, is provided with a handle unit, which is a door handle 3 in this embodiment. The door handle 3 is manipulated to open and close the sliding door 1.

The sliding door 1 is provided with a front lock mechanism 5*a*, which restrains the sliding door 1 at a fully closed position, and a rear lock mechanism 5*b*. The front lock mechanism 5*a* and the rear lock mechanism 5*b* form a fully closed lock mechanism. Furthermore, the sliding door 1 is provided with a fully open lock mechanism 5*c*, which restrain the sliding door 1 at the fully open position. The lock mechanisms (in other words, latch mechanisms) 5 are mechanically connected to the door handle 3 via a transmission member such as a wire that extends from a remote control 6.

A movable handgrip 10 is provided on the door handle 3, which functions as a manipulation input section, and manipulation force based on manipulation input to the door handle 3 is transmitted to the lock mechanisms 5 from the handgrip 10. The handgrip 10 has a known configuration in which, when the handgrip 10 is manipulated toward the vehicle rear side, which is the opening direction of the sliding door 1, the distal end (end toward a vehicle front side) of the handgrip 10 is pulled. Upon receipt of the manipulation force, each of the lock mechanisms 5 releases restraint of the sliding door 1 to permit the sliding door 1 at the fully closed position to move in the opening direction, or the sliding door 1 at the fully open position to move in a closing direction.

The sliding door 1 includes a drive section, which is capable of opening and closing the sliding door 1. The drive section is a door opening/closing actuator (opening/closing ACT) 20 in this embodiment. The door opening/closing actuator 20 is configured to open and close the sliding door 1, which is a drive target of the door opening/closing actuator 20, when a control section, which is a door ECU 22 in this embodiment, supplies driving power to a motor 21, which is a drive source of the door opening/closing actuator 20.

A contact-type manipulation detecting switch 23, which operates in response to the motion of the handgrip 10, is provided on the door handle 3. Based on a manipulation input signal Sc output from the manipulation detecting switch 23, the door ECU 22 detects a manipulation input (presence/absence of a manipulation input) to the door handle 3. An operation position sensor 25 is connected to the door ECU 22. The door ECU 22 detects the operation position (opening/closing position) of the sliding door 1 based on a signal (operation position signal Sp) output from the operation position sensor 25. The door ECU 22 controls operation of the door opening/closing actuator 20 to open or close (or stop) the sliding door 1 in accordance with the manipulation input to the door handle 3 and the detected operation position of the sliding door 1.

In the present embodiment, the manipulation detecting switch 23 and the door ECU 22 configure a manipulation input detector. Furthermore, the operation position sensor 25 and the door ECU 22 configure an operation position detecting section.

The manner and procedure of a door opening/closing control according to the present embodiment will now be described. The door ECU 22 periodically executes the computation process shown in the flowchart of FIG. 2.

Figure 2:
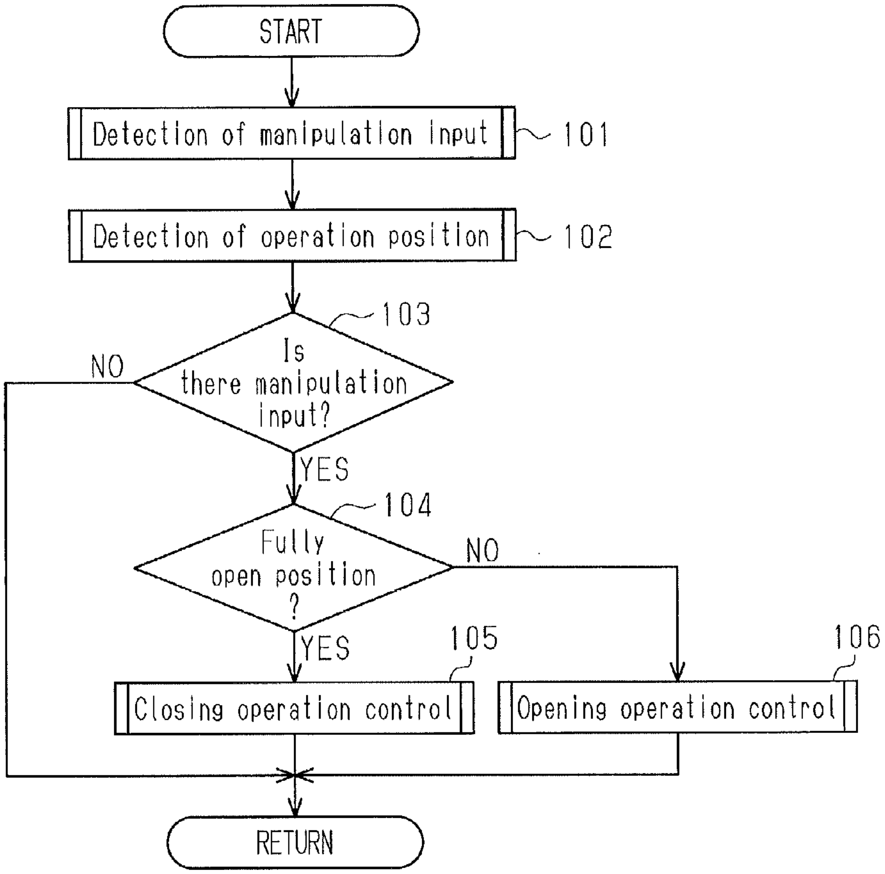
FIG. 2 is a flowchart showing the manner of a door opening/closing control.

As shown in the flowchart of FIG. 2, the door ECU 22 first executes a manipulation input detecting procedure (step 101) based on the manipulation input signal Sc and an operation position detecting procedure (step 102) based on the operation position signal Sp. The door ECU 22 then determines whether there is a manipulation input to the door handle 3 (step 103). If it is determined that there is a manipulation input, that is, if a manipulation input is detected (step 103: YES), the door ECU 22 subsequently determines whether the sliding door 1 is at the fully open position (step 104). If it is determined that the sliding door 1 is at the fully open position (step 104: YES), the door ECU 22 executes a closing operation control to close the sliding door 1 (step 105) by the door opening/closing actuator 20.

If it is determined, in step 104, that the sliding door 1 is not at the fully open position (step 104: NO), the door ECU 22 executes an opening operation control to allow the sliding door 1 to be opened by the door opening/closing actuator 20 (step 106). The case in which the sliding door 1 is "not at the fully open position" includes, for example, a case in which the sliding door 1 is stopped between the fully open position and the fully closed position due to detection of a foreign object in addition to a case in which the sliding door 1 is at the fully closed position. If it is determined, in step 103, that there is no manipulation input to the door handle 3 (a manipulation input is not detected) (step 103: NO), the door ECU 22 does not execute the processes of step 104 and the subsequent steps.

The door control device 30 of the present embodiment, which executes the procedure as described above, reduces the burden on users by opening or closing the sliding door 1 in accordance with the situation in which the door handle 3 is manipulated.

Operation Speed Varying Control

The manner of the operation speed varying control according to the present embodiment will now be described.

The door ECU 22 of the present embodiment has a function to control the door opening/closing actuator 20 (see FIG. 1) in a drive mode selected from drive modes with the operation speed of the sliding door 1 set to different speeds. More specifically, the door ECU 22 includes a basic drive mode, which is a normal mode, and a high-speed operation mode as the drive modes. The operation speed of the sliding door 1 in the high-speed operation mode is greater than that in the normal mode. The opening/closing control (opening operation control or closing operation control) of the sliding door 1 is started in the normal mode among the two drive modes.

Figure 3:
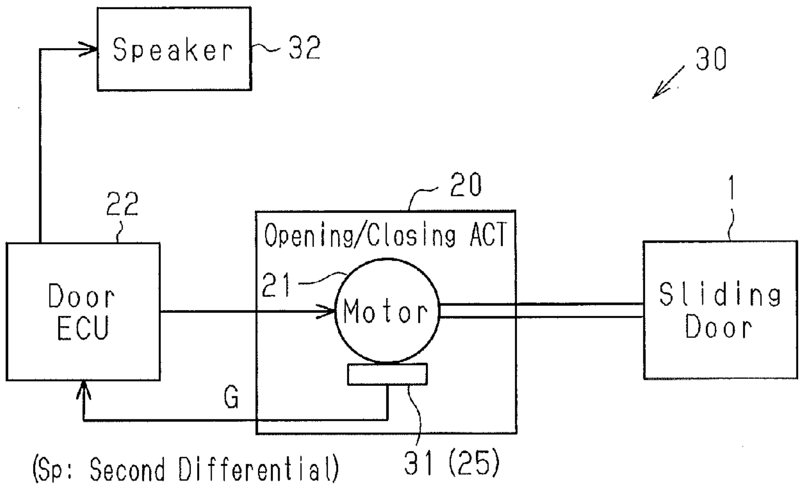
FIG. 3 is a control block diagram of the door control device according to a first embodiment.

The door ECU 22 of the present embodiment detects acceleration (G) in the operation direction of the sliding door 1 in operation. Concretely, as shown in FIG. 3, the motor 21 of the door opening/closing actuator 20 is provided with a motor rotation sensor 31, which detects rotation of the motor 21, and more specifically outputs pulse signals in accordance with rotation of the motor 21. The door ECU 22 detects the operation position of the sliding door 1 by counting the pulse signals output from the motor rotation sensor 31. That is, the motor rotation sensor 31 functions as the operation position sensor 25. The motor rotation sensor 31 includes, for example, a hall IC. The door ECU 22 detects the acceleration G of the sliding door 1 in the operation direction by differentiating the detected operation position of the sliding door 1 twice.

Furthermore, the door ECU 22 detects, based on detection of the acceleration G, an external force input that acts on the sliding door 1 in the operation direction, that is, an external force input intended to accelerate the sliding door 1. More specifically, the door ECU 22 determines that there is an external force input intended to accelerate the sliding door 1 when the detected acceleration G is greater than or equal to a predetermined value G0. Upon detection of the external force input intended to accelerate the sliding door 1, the door ECU 22 switches the drive mode from the normal mode, which is selected at the starting of the opening/closing control, to the high-speed operation mode.

In the present embodiment, the door ECU 22 functions as a speed varying section, an acceleration detector, and an acceleration sensing speed varying section. That is, when the user presses or pulls the sliding door 1 in the operation direction to increase the operation speed of the sliding door 1, the sliding door 1 gains acceleration G. The door ECU 22 monitors the acceleration G of the sliding door 1 to determine whether such "an external force intended to accelerate the sliding door 1" has been input to the sliding door 1. The door ECU 22 controls the door opening/closing actuator 20 to accelerate the operation speed of the sliding door 1 in response to an acceleration request represented by "the external force input intended to accelerate the sliding door 1".

Figure 4:
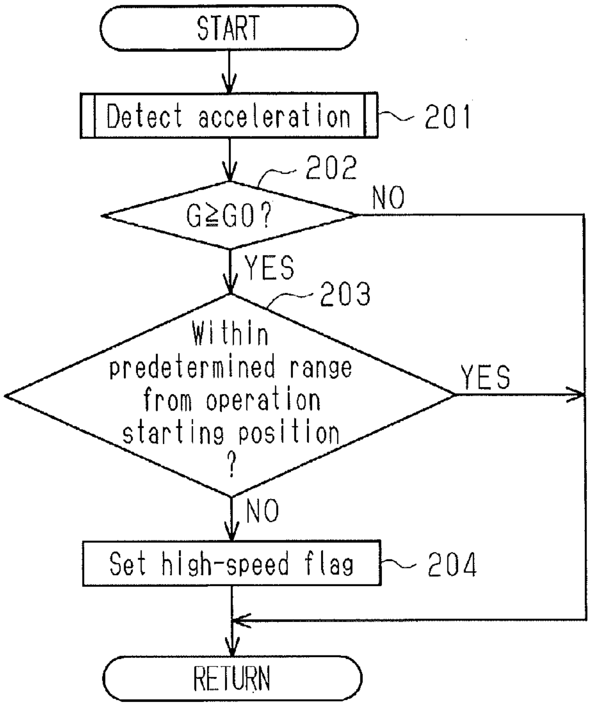
FIG. 4 is a flowchart showing the procedure of an operation speed varying control according to the first embodiment.

More specifically, as shown in the flowchart of FIG. 4, the door ECU 22 executes the procedure for detecting the acceleration G of the sliding door 1 in the operation direction during operation of the sliding door 1 (during the opening operation control or the closing operation control) (step 201). The door ECU 22 determines whether the acceleration G is greater than or equal to the predetermined value G0 (step 202).

Figure 5:
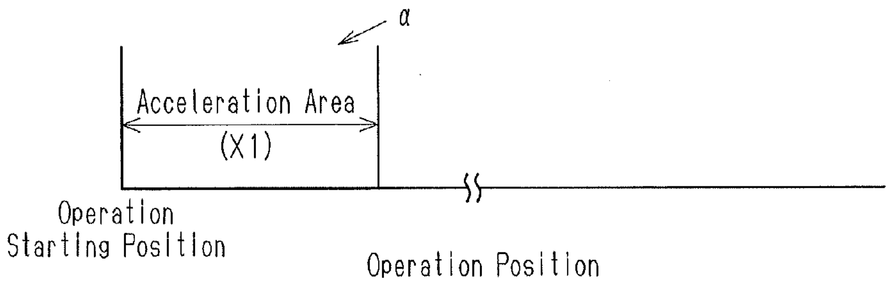
FIG. 5 is an explanatory diagram showing a predetermined range set corresponding to an acceleration area.

In step 202, if acceleration G that is greater than or equal to the predetermined value G0 is detected (G≥G0, step 202: YES), the door ECU 22 subsequently determines whether the operation position of the sliding door 1 is within a predetermined range from an operation starting position (the fully closed position or the fully open position, or an intermediate stopping position) (step 203). More specifically, as shown in FIG. 5, "the predetermined range from the operation starting position" is set corresponding to, in the normal mode, a distance X1 by which the sliding door 1 proceeds before reaching a steady speed from a stopped state, that is, an acceleration area α from the operation starting position to a position where the sliding door 1 reaches the steady speed. If the operation position of the sliding door 1 is already out of "the predetermined range from the operation starting position", that is, out of the acceleration area α (step 203: NO), the door ECU 22 sets a high-speed flag to switch the drive mode to the high-speed operation mode (step 204).

In step 202, if the acceleration G of the sliding door 1 is less than the predetermined value G0 (G<G0, step 202: NO), the door ECU 22 does not execute the processes of step 203 and step 204. In step 203, if the operation position of the sliding door 1 is within "the predetermined range from the operation starting position (acceleration area α)" (step 203: YES), the door ECU 22 does not execute the process of step 204.

Figure 6:
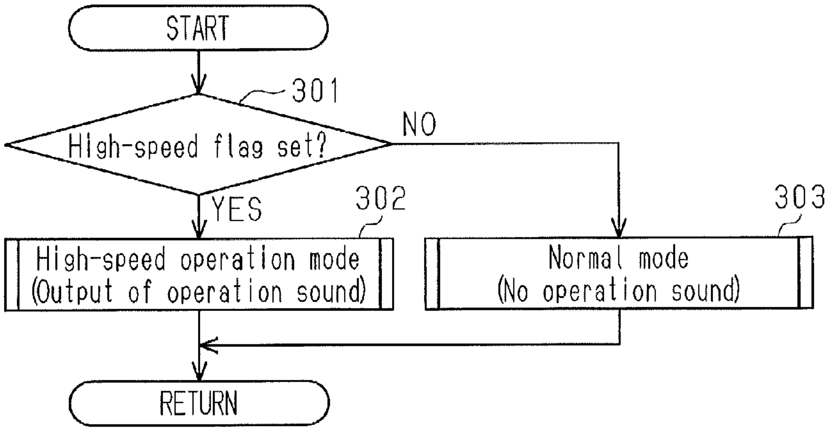
FIG. 6 is a flowchart showing the procedure for switching drive modes.

The door ECU 22 executes the processes of step 201 to step 204 in the opening/closing control procedure (the opening operation control or the closing operation control) that is under execution. As shown in the flowchart of FIG. 6, if the high-speed flag is set (step 301: YES), the door ECU 22 executes the opening/closing control of the sliding door 1 in the high-speed operation mode (step 302), and if the high-speed flag is not set (step 301: NO), the door ECU 22 executes the opening/closing control of the sliding door 1 in the normal mode (step 303).

In the present embodiment, the drive mode is switched based on detection of "an external force input intended to accelerate the sliding door 1" as described above. However, the drive mode is not switched to the high-speed operation mode in the acceleration area α, which is the predetermined range from the operation starting position. Thus, if the sliding door 1 is in an accelerating state due to a factor other than an external force at the initial stage of activation of the motor 21, the drive mode is prevented from being switched to the high-speed operation mode due to the accelerating state.

As shown in FIG. 3, a notification device, which is a speaker 32, is connected to the door ECU 22. The door ECU 22, which configures the notification section with the speaker 32, outputs an operation sound from the speaker 32 when the drive mode is switched to the high-speed operation mode (see FIG. 6, step 302). The operation sound is not output in the normal mode. The operation sound notifies the user that the drive mode has been switched to change the operation speed of the sliding door 1.

Figure 7:
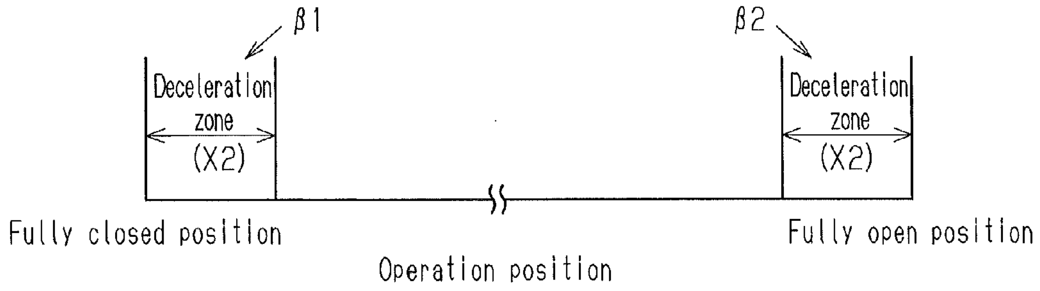
FIG. 7 is an explanatory diagram showing deceleration zones set corresponding to a fully closed position and a fully open position.

As shown in FIG. 7, deceleration zones β1, β2 are set in the vicinity of the fully open position and the fully closed position of the sliding door 1 in the present embodiment. The deceleration zones β1, β2 are each set as a range where the remaining distance by which the sliding door 1 reaches the fully closed position or the fully open position is less than or equal to a predetermined value X2. That is, the deceleration zones β1, β2 are zones between the fully closed position or the fully open position of the sliding door 1 and a position separated by the predetermined value X2. The door ECU 22 of the present embodiment is configured such that, if the drive mode is the high-speed operation mode at the time when the sliding door 1 enters the deceleration zones β1, β2, the door ECU 22 switches the drive mode from the high-speed operation mode to the normal mode.

Figure 8:
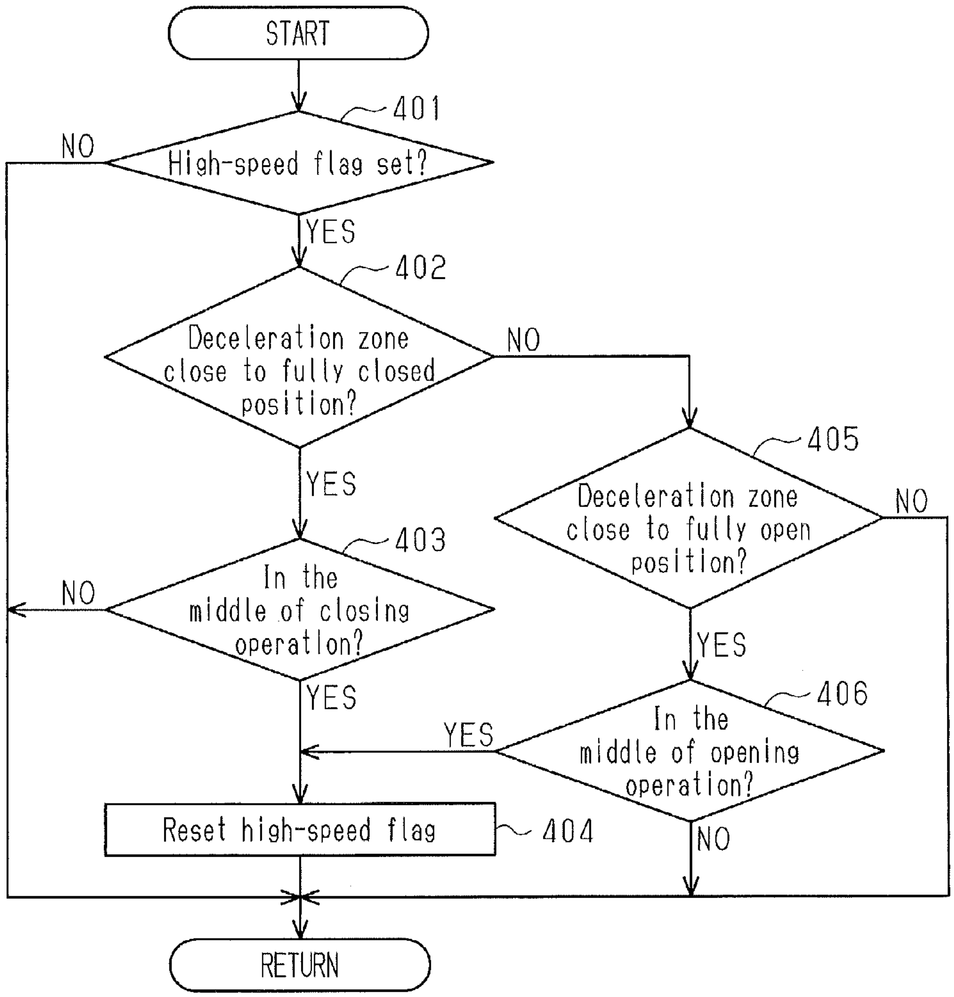
FIG. 8 is a flowchart showing the procedure of mode shift determination upon entering each deceleration zone.

More specifically, as shown in the flowchart of FIG. 8, the door ECU 22 determines whether the high-speed flag is set (step 401). If the high-speed flag is set (step 401: YES), the door ECU 22 first determines whether the operation position of the sliding door 1 is in the deceleration zone β1 close to the fully closed position (step 402). Also, if it is determined, in step 402, that the operation position of the sliding door 1 is in the deceleration zone β1 close to the fully closed position (step 402: YES), the door ECU 22 subsequently determines whether the sliding door 1 is in the middle of closing operation (step 403). If it is determined that the sliding door 1 is in the middle of close operation, that is, if the sliding door 1 enters the deceleration zone β1 close to the fully closed position (step 403: YES), the door ECU 22 resets the high-speed flag (step 404).

If it is determined, in step 402, that the operation position of the sliding door 1 is not in the deceleration zone 131 close to the fully closed position (step 402: NO), the door ECU 22 determines whether the operation position of the sliding door 1 is in the deceleration zone 132 close to the fully open position (step 405). If it is determined, in step 405, that the operation position of the sliding door 1 is in the deceleration zone β2 close to the fully open position (step 405: YES), the door ECU 22 subsequently determines whether the sliding door 1 is in the middle of opening operation (step 406). If it is determined that the sliding door 1 is in the middle of opening operation, that is, if the sliding door 1 enters the deceleration zone β2 close to the fully open position (step 406: YES), the door ECU 22 resets the high-speed flag in step 404.

If it is determined, in step 403, that the sliding door 1 is not in the middle of closing operation (step 403: NO), or if it is determined, in step 406, that the sliding door 1 is not in the middle of opening operation (step 406: NO), the door ECU 22 does not execute the process in step 404. Furthermore, if it is determined, in step 405, that the operation position of the sliding door 1 is not in the deceleration zone β2 close to the fully open position, that is, not in either deceleration zones β1, β2 (step 404: NO), the door ECU 22 does not execute the processes in steps 404, 406. If it is determined, in step 401, that the high-speed flag is not set (step 401: NO), the door ECU 22 does not execute the processes of step 402 and the subsequent steps.

The door ECU 22 executes the processes of step 401 to step 406 in the opening/closing control procedure (the closing operation control or the opening operation control)

that is under execution. If the high-speed flag is reset in step 404, the drive mode is switched from the high-speed operation mode to the normal mode. Thus, the sliding door 1 that has entered the deceleration zones β1, β2 in the high-speed operation mode decelerates.

In a state where the sliding door 1 is in a stopped state, the high-speed flag is reset and the drive mode is switched to the normal mode regardless of the operation position of the sliding door 1. Thus, the next opening/closing control of the sliding door 1 will be started in the normal mode.

Operation of the door control device according to the present embodiment configured as described above will now be described.

Figure 9:
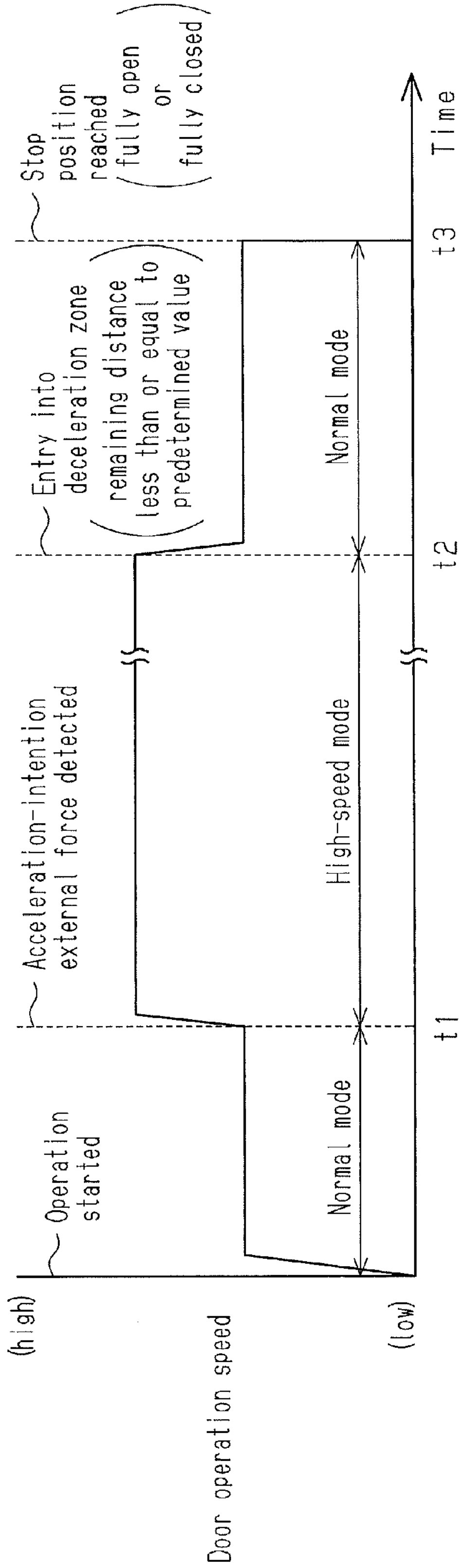
FIG. 9 is an explanatory diagram showing operation of the operation speed varying control based on detection of an external force input.

As shown in FIG. 9, upon detection of the manipulation input to the door handle 3, the opening/closing control of the sliding door 1 is started in the normal mode.

Subsequently, when the user presses or pulls the sliding door 1 in the operation direction to increase the operation speed of the sliding door 1, the sliding door 1 gains acceleration G. Based on the acceleration G, an external force input intended to accelerate the sliding door 1 is detected. In response to the detection, the drive mode is switched to the high-speed operation mode, and the operation speed of the sliding door 1 is increased (point in time t1).

Subsequently, if the sliding door 1 enters the deceleration zone, the drive mode is switched from the high-speed operation mode to the normal mode, and the operation speed of the sliding door 1 decelerates (point in time t2).

While continuing to be decelerated, the sliding door 1 reaches the stop position, which is the fully closed position or the fully open position (point in time t3).

The present embodiment has the following advantages.

(1) The door ECU 22 detects the acceleration G in the operation direction of the sliding door 1 in operation. If the detected acceleration G is greater than or equal to the predetermined value G0 (G≥G0), the door ECU 22 determines that there is an external force input intended to accelerate the sliding door 1 and switches the drive mode of the sliding door 1 from the normal mode, which is selected at the starting of the opening/closing control, to the high-speed operation mode.

The acceleration G of the sliding door 1 is changed by the external force that acts on the sliding door 1 in the operation direction. Thus, according to the above configuration, the operation speed of the sliding door 1 is increased through intuitive manipulation such as pressing or pulling the sliding door 1 in the operation direction. Also, since the sliding door 1 in a state driven by the motor 21 serves as the manipulation input section, "an external force intended to accelerate the sliding door 1" is input to the sliding door 1 by a relatively small manipulation force (pressing force/pulling force) only for purely applying an accelerating force. This reduces influence on the manipulation force caused by deterioration with age. As a result, the sliding door 1 is opened or closed more reliably at a speed that the user desires.

(2) If the operation position of the sliding door 1 is within "the predetermined range (acceleration area α) from the operation starting position" (step 203: YES), the door ECU 22 does not set the high-speed flag. Thus, if the sliding door 1 is in the acceleration area α, switching of the drive mode from the normal mode to the high-speed operation mode, that is, the control for accelerating the operation speed of the sliding door 1 is not executed.

That is, when the sliding door 1 is moving in the acceleration area α, which is the predetermined range from the operation starting position, there is a possibility that the accelerating state at the initial stage of activation of the motor 21 may be erroneously detected as the above-mentioned "external force input intended to accelerate the sliding door 1". However, according to the above configuration, when the sliding door 1 is moving in the acceleration area α, the drive mode is not switched to the high-speed operation mode. This prevents the sliding door 1 from being operated at high speed due to such an erroneous detection. As a result, the sliding door 1 is opened or closed more reliably at a speed that the user desires.

(3) The deceleration zones β1, β2 are set in the vicinity of the fully open position and the fully closed position of the sliding door 1. If the drive mode is the high-speed operation mode at the time when the sliding door 1 enters the deceleration zones β1, β2, the door ECU 22 switches the drive mode from the high-speed operation mode to the normal mode. In other words, when the sliding door 1 is in inhibiting zones corresponding to the fully open position and the fully closed position, the control for accelerating the operation speed of the sliding door 1 is not performed.

With the above configuration, since the sliding door 1 decelerates before reaching the stop position, which is the fully open position or the fully closed position, the sensation associated with the operation of the sliding door 1 is improved. In particular, when fully closing the sliding door 1, load applied to a foreign object that might get caught between the sliding door 1 and the vehicle body is reduced.

(4) When the drive mode is switched to the high-speed operation mode, the door ECU 22 outputs an operation sound from the speaker 32.

With the above configuration, the user is notified, by a sound, of the change in the operation speed of the sliding door 1 due to switching of the drive modes. Thus, the user is informed and warned of, for example, the fact that the operation speed of the sliding door 1 is accelerated.

Second Embodiment

A second embodiment of the present invention will now be described with reference to the drawings. Like or the same reference numerals are given to those components that are like or the same as the corresponding components of the first embodiment and detailed explanations are omitted.

The present embodiment differs from the first embodiment in the method for detecting "an external force input intended to accelerate the sliding door 1".

Figure 10:
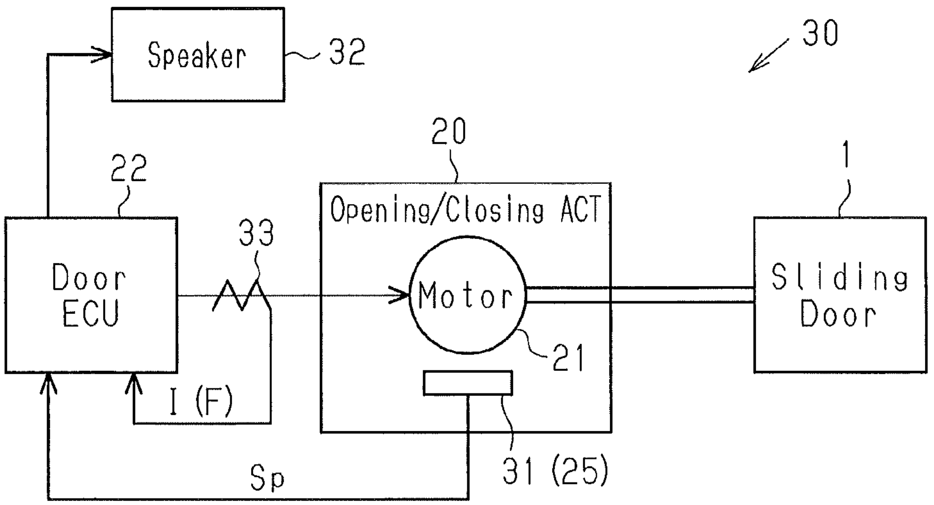
FIG. 10 is a control block diagram of the door control device according to a second embodiment.

More specifically, the door ECU 22 of the present embodiment detects an operation load (F) on the sliding door 1 in operation as shown in FIG. 10. Concretely, based on output signals of a current sensor 33, which is provided in an electric power supply passage, the door ECU 22 detects a motor current I supplied to the motor 21. Furthermore, the door ECU 22 detects an external force input that acts on the sliding door 1 in the operation direction, that is, an external force input intended to accelerate the sliding door 1 based on the operation load F represented by the motor current I.

The drive torque of the motor 21 is dependent on the motor current I. Thus, the operation load F of the sliding door 1 driven by the motor 21 (the door opening/closing actuator 20) is detected (estimated) based on the detected motor current I. In the present embodiment, the door ECU 22 functions as an operation load detector and an operation load sensing speed varying section.

If the user presses or pulls the sliding door 1 in the operation direction to increase the operation speed of the sliding door 1, the operation load F of the sliding door 1 changes (more specifically, the operation load F is reduced). The door ECU 22 monitors the operation load F of the sliding door 1 to determine whether "an external force intended to accelerate the sliding door 1" has been input to the sliding door 1. Upon detection of "an external force intended to accelerate the sliding door 1", the door ECU 22 switches the drive mode from the normal mode, which is selected at the starting of the opening/closing control, to the high-speed operation mode.

Figure 11:
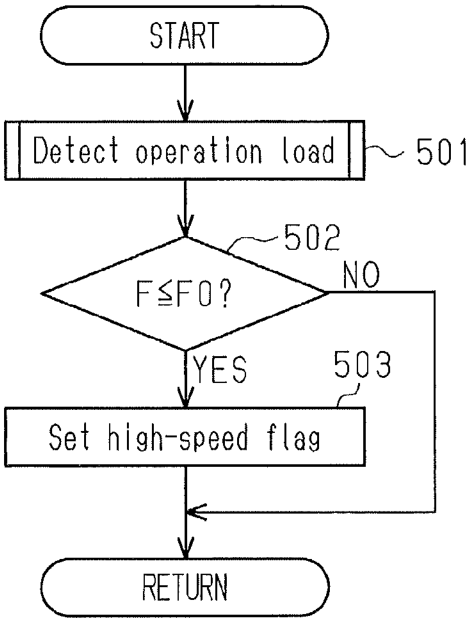
FIG. 11 is a flowchart showing the procedure of an operation speed varying control according to the second embodiment.

More specifically, as shown in the flowchart of FIG. 11, after detecting the operation load F of the sliding door 1 (step 501), the door ECU 22 determines whether the operation load F is less than or equal to a predetermined value F0 (step 502). If the operation load F is less than or equal to the predetermined value F0 (F≤F0, step 502: YES), the door ECU 22 determines that there is an external force input intended to accelerate the sliding door 1 and sets the high-speed flag (step 503).

In step 502, if the operation load F is greater than the predetermined value F0 (F>F0, step 502: NO), the door ECU 22 determines that there is no external force input intended to accelerate the sliding door 1, and does not execute the process of step 503.

The door ECU 22 executes the processes of step 501 to step 503 in the opening/closing control procedure (the opening operation control or the closing operation control) that is under execution. The door ECU 22 controls the door opening/closing actuator 20 to accelerate the operation speed of the sliding door 1 by switching the drive modes based on detection of "an external force input intended to accelerate the sliding door 1".

The configuration of the present embodiment also provides the same advantages as the first embodiment. Furthermore, the configuration in which "an external force input intended to accelerate the sliding door 1" is detected based on the operation load F of the sliding door 1 suppresses the occurrence of erroneous detection in the acceleration area α, which is the predetermined range from the operation starting position of the sliding door 1. That is, since the operation load F is basically high in the acceleration area cc, the value of the operation load F is unlikely to be less than or equal to the predetermined value F0. Thus, the sliding door 1 is opened and closed at an appropriate speed that the user desires with a more simple structure without the need for determining whether the sliding door 1 is in the acceleration area α, that is, without the need for a process such as step 203 in FIG. 4.

Each of the illustrated embodiments may be modified as follows.

In each of the embodiments, the present invention is embodied in the door control device 30, which opens and closes the sliding door 1 provided on the side surface of the vehicle body. However, the present invention may be applied to a control device for other doors such as a swing door, or a back door or a luggage door provided at the vehicle rear portion. The present invention may also be applied to an opening/closing body control device for a vehicle intended for an opening/closing body other than doors such as a sunroof unit and a power window unit.

In the first embodiment, the motor rotation sensor 31 functions as the operation position sensor 25. However, a displacement sensor that directly detects the operation position of the sliding door 1 may be used as the operation position sensor 25. Also, the method for detecting the operation position of the sliding door 1 does not need to be based on counting of the pulse signals, but may be based on detection of the absolute angle of the motor 21.

Figure 12:
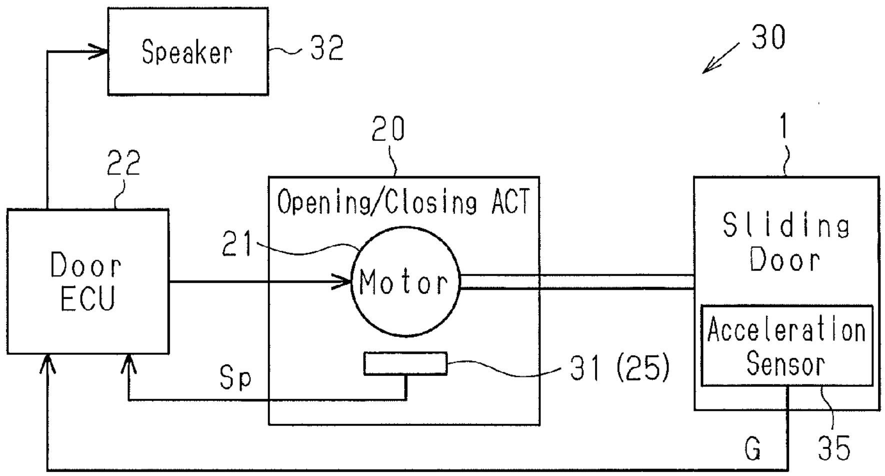
FIG. 12 is a control block diagram of a door control device according to a modification.

In the first embodiment, the operation position of the sliding door 1 is detected by counting the pulse signals output from the motor rotation sensor 31, and the acceleration G of the sliding door 1 in the operation direction is detected by differentiating the operation position twice. However, for example, an acceleration sensor 35 may be provided on the sliding door 1 as shown in FIG. 12, and the acceleration G of the sliding door 1 may be detected more directly.

In the second embodiment, the operation load F of the sliding door 1 driven by the motor 21 (the door opening/closing actuator 20) is detected (estimated) based on the motor current I. However, in addition to the motor current I or instead of the motor current I, the operation load F may be detected based on the rotational speed of the motor 21 (or the operation speed of the sliding door 1).

Figure 13:
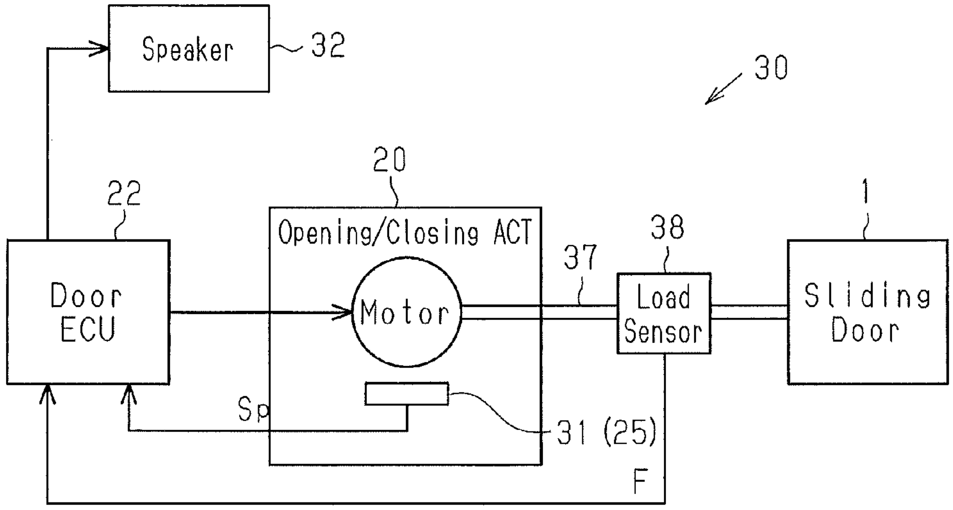
FIG. 13 is a control block diagram of a door control device according to another modification.

Furthermore, for example, a load sensor 38 may be provided in a drive transmission system 37, which transmits the driving force of the motor 21 to the sliding door 1, as shown in FIG. 13. Such a load sensor 38 may be formed using a known strain gauge. The operation load F of the sliding door 1 may be detected more directly based on output signals of the load sensor 38.

An external force input intended to accelerate the sliding door 1 is detected based on the acceleration G of the sliding door 1 in the first embodiment, and based on the operation load F of the sliding door 1 in the second embodiment. However, "an external force input intended to accelerate the sliding door 1" may be detected based on both the acceleration G and the operation load F. Furthermore, configurations that detect "an external force input intended to accelerate the sliding door 1" by other methods are not excluded.

In each of the above embodiments, the deceleration zones β1, β2 are set in the vicinity of the fully open position and the fully closed position of the sliding door 1. However, the deceleration zone may be set only in the vicinity of one of the fully open position and the fully closed position. The configuration that does not set the deceleration zones is also not excluded.

In each of the above embodiments, an operation sound is output from the speaker 32 when the drive mode is switched to the high-speed operation mode during the opening or closing operation of the sliding door 1, and an operation sound is not output in the normal mode. However, the user may be notified of a change in the operation speed by outputting a pulse sound the time intervals of which change in accordance with the operation speed of the sliding door 1, or by changing the volume or the pitch of the notification sound in accordance with the operation speed of the sliding door 1. Beside the sound, for example, the user may be notified of a change in the operation speed by light (such as time intervals of flashing light or the color of the light). The configuration that does not notify the user of a change in the operation speed (change in the drive modes) is also not excluded.

In each of the above described embodiments, the door ECU 22 includes the normal mode and the high-speed operation mode as the drive modes. However, three or more drive modes may be provided.

In this case, switching manner of the drive modes may be set in various ways. That is, any configuration may be employed for "switching the drive mode to the high-speed operation mode" as long as the drive mode is switched to another drive mode with the operation speed of the sliding door 1 greater than the current drive mode regardless of which drive mode is selected before detection of "an external force input intended to accelerated the sliding door 1".

In each of the above embodiments, if the drive mode is the high-speed operation mode when the sliding door 1 enters the deceleration zones β1, β2, the drive mode is restored to the normal mode. However, the drive mode after switching does not necessarily have to be the normal mode as long as a drive mode is selected that has a slower operation speed of the sliding door 1 than the high-speed operation mode.

The output of the motor 21 may be increased to accelerate the sliding door 1 only during the period in which "an external force input intended to accelerate the sliding door 1" is detected.

According to the second embodiment, in the procedure of the flowchart of FIG. 11, it is not determined whether the sliding door 1 is in the acceleration area α. However, the process for determining whether the sliding door 1 is in the acceleration area α, that is, the process of step 203 of FIG. 4 may be executed as in the first embodiment. Such a configuration more reliably prevents the sliding door 1 from being operated at high speed by erroneous detection.

In the first embodiment, step 203 of FIG. 4 may be omitted as long as the predetermined value G0 for the acceleration G is appropriately set to avoid erroneous detection.

The invention claimed is:

1. An opening/closing body control device for a vehicle, comprising:

a drive section configured to drive an opening/closing body of the vehicle;

a controller configured to control the drive section;

a detector configured to detect an external force acting on the opening/closing body when the drive section is driving the opening/closing body to move the opening/closing body at a first operation speed, the external force acting on the opening/closing body to move the opening/closing body at a speed greater than the first operation speed; and the controller including a speed varying section that controls the drive section to move the opening/closing body at a second operation speed greater than the first operation speed in response to detection of the external force such that when the detector detects the external force to be equal to any value within a range greater than a predetermined value, the speed section of the controller controls the drive section to move the opening/closing body at the second operation speed.

2. The opening/closing body control device for a vehicle according to claim 1, further comprising an acceleration detector that detects acceleration of the opening/closing body in the operation direction, wherein the speed varying section includes an acceleration sensing speed varying section, and when the acceleration is greater than or equal to a predetermined value, the acceleration sensing speed varying section (i) determines that an external force intended to accelerate the opening/closing body acts on the opening/closing body, and (ii) controls the drive section to move the opening/closing body at the second operation speed.

3. The opening/closing body control device for a vehicle according to claim 2, wherein the acceleration detector detects the acceleration of the opening/closing body based on an output signal of an acceleration sensor provided in the opening/closing body.

4. The opening/closing body control device for a vehicle according to claim 2, wherein the drive section includes a motor, and the acceleration detector detects the acceleration of the opening/closing body based on an output signal of a motor rotation sensor, which detects rotation of the motor.

5. The opening/closing body control device for a vehicle according to claim 2, wherein the acceleration detector detects the acceleration of the opening/closing body based on an output signal of a displacement sensor, which detects an operation position of the opening/closing body.

6. The opening/closing body control device for a vehicle according to claim 1, further comprising an operation load detector that detects an operation load of the opening/closing body, wherein the speed varying section includes an operation load sensing speed varying section, and when the operation load is less than or equal to a predetermined value, the operation load sensing speed varying section (i) determines that an external force intended to accelerate the opening/closing body acts on the opening/closing body, and (ii) controls the drive section to move the opening/closing body at the second operation speed.

7. The opening/closing body control device for a vehicle according to claim 6, wherein the operation load detector detects the operation load of the opening/closing body based on an output signal of a load sensor provided in a drive transmission system between the drive section and the opening/closing body.

8. The opening/closing body control device for a vehicle according to claim 6, wherein the drive section includes a motor, and the operation load detector detects the operation load of the opening/closing body based on a motor current supplied to the motor.

9. The opening/closing body control device for a vehicle according to claim 1, further comprising a position detector that detects an operation position of the opening/closing body, wherein the speed varying section is configured not to perform a control to move the opening/closing body at the second operation speed when the opening/closing body is located within a predetermined range from an operation starting position of the opening/closing body.

10. The opening/closing body control device for a vehicle according to claim 1, further comprising a position detector that detects an operation position of the opening/closing body, the speed varying section is configured to set a deceleration zone corresponding to at least one of a fully open position and a fully closed position of the opening/closing body, and the speed varying section is configured such that, when the opening/closing body enters the deceleration zone at the second operation speed, the speed varying section switches the operation speed of the opening/closing body to a speed slower than the second operation speed.

11. The opening/closing body control device for a vehicle according to claim 1, wherein the speed varying section sets an inhibiting zone corresponding to at least one of a fully open position and a fully closed position of the opening/closing body, and the speed varying section is configured not to perform a control to move the opening/closing body at the second operation speed when the opening/closing body is in the inhibiting zone.

12. The opening/closing body control device for a vehicle according to claim 1, wherein the controller includes a notification section that notifies a user of a change in the operation speed.

13. The opening/closing body control device for a vehicle according to claim 1, wherein the speed varying section is configured, in response to detection of the external force, to control the drive section to move the opening/closing body at the second operation speed so that the opening/closing body keeps moving at the second operation speed even after the external force acting on the opening/closing body is canceled.

14. The opening/closing body control device for a vehicle according to claim 1, further comprising a position detector that detects an operation position of the opening/closing body, wherein:

the drive section includes a motor; and the speed varying section is configured not to perform a control to move the opening/closing body at the second operation speed when the opening/closing body is located within a predetermined range from an operation starting position of the opening/closing body, the predetermined range being a range within which the motor is accelerating at an initial stage of activation of the motor.

15. An opening/closing body control device for a vehicle, comprising:

a drive section configured to drive an opening/closing body of the vehicle;

a controller configured to control the drive section, the controller being configured to operate in a normal operation mode that controls the drive section to move the opening/closing body at a predetermined operation speed upon detecting manipulation of the opening/closing body, and in a high-speed operation mode that controls the drive section to move the opening/closing body at an operation speed greater than the predetermined operation speed;

a detector configured to detect an external force acting on the opening/closing body when the controller is controlling the drive section in the normal operation mode to move the opening/closing body at the predetermined operation speed, the external force acting on the opening/closing body to move the opening/closing body at a speed greater than the predetermined operation speed, and the external force being different from and subsequent to the manipulation of the opening/closing body; and wherein the controller includes a speed varying section that controls the drive section in the high-speed operation mode in response to detection of the external force.

16. The opening/closing body control device for a vehicle according to claim 15, wherein the speed varying section is configured, in response to detection of the external force, to control the drive section in the high-speed operation mode so that the high-speed operation mode is maintained even after the external force acting on the opening/closing body is canceled.

17. The opening/closing body control device for a vehicle according to claim 15, further comprising a position detector that detects an operation position of the opening/closing body, wherein the drive section includes a motor, and the speed varying section is configured not to switch an operation mode of the drive section to the high-speed operation mode when the opening/closing body is located within a predetermined range from an operation starting position of the opening/closing body, the predetermined range being a range within which the motor is accelerating at the initial stage of activation of the motor.

18. An opening/closing body control device for a vehicle, comprising:

a drive section configured to drive an opening/closing body of the vehicle;

a controller configured to control the drive section, the controller including a speed varying section that controls the drive section to increase an operation speed of the opening/closing body in response to detection of an external force acting on the opening/closing body to accelerate the opening/closing body that is being driven by the drive section;

an acceleration detector that detects acceleration of the opening/closing body in the operation direction;

the controller being configured to control the drive section in a drive mode selected from a plurality of drive modes, each of the drive modes having an operation speed of the opening/closing body set to a different speed, and the speed varying section including an acceleration sensing speed varying section, and when the acceleration detected by the acceleration detector is equal to any value within a range greater than or equal to a predetermined value, the acceleration sensing speed varying section (i) determines that an external force intended to accelerate the opening/closing body acts on the opening/closing body, and (ii) switches the drive mode to a high-speed operation mode, in which the operation speed is a predetermined speed greater than that in the drive mode selected before the detection of the external force.

19. The opening/closing body control device for a vehicle according to claim 18, further comprising a position detector that detects an operation position of the opening/closing body, wherein:

the drive section includes a motor; and the speed varying section is configured not to switch the drive mode to the high-speed operation mode when the opening/closing body is located within a predetermined range from an operation starting position of the opening/closing body, the predetermined range being a range within which the motor is accelerating at the initial stage of activation of the motor.

* * * * *